Dec. 8, 1970   R. G. WILL ET AL   3,546,112
ABSORPTION OIL SKIMMER

Filed Jan. 29, 1968   2 Sheets-Sheet 1

INVENTORS.
Robert G. Will
William F. Swiss, Jr.
BY James F. Simons
ATTORNEY

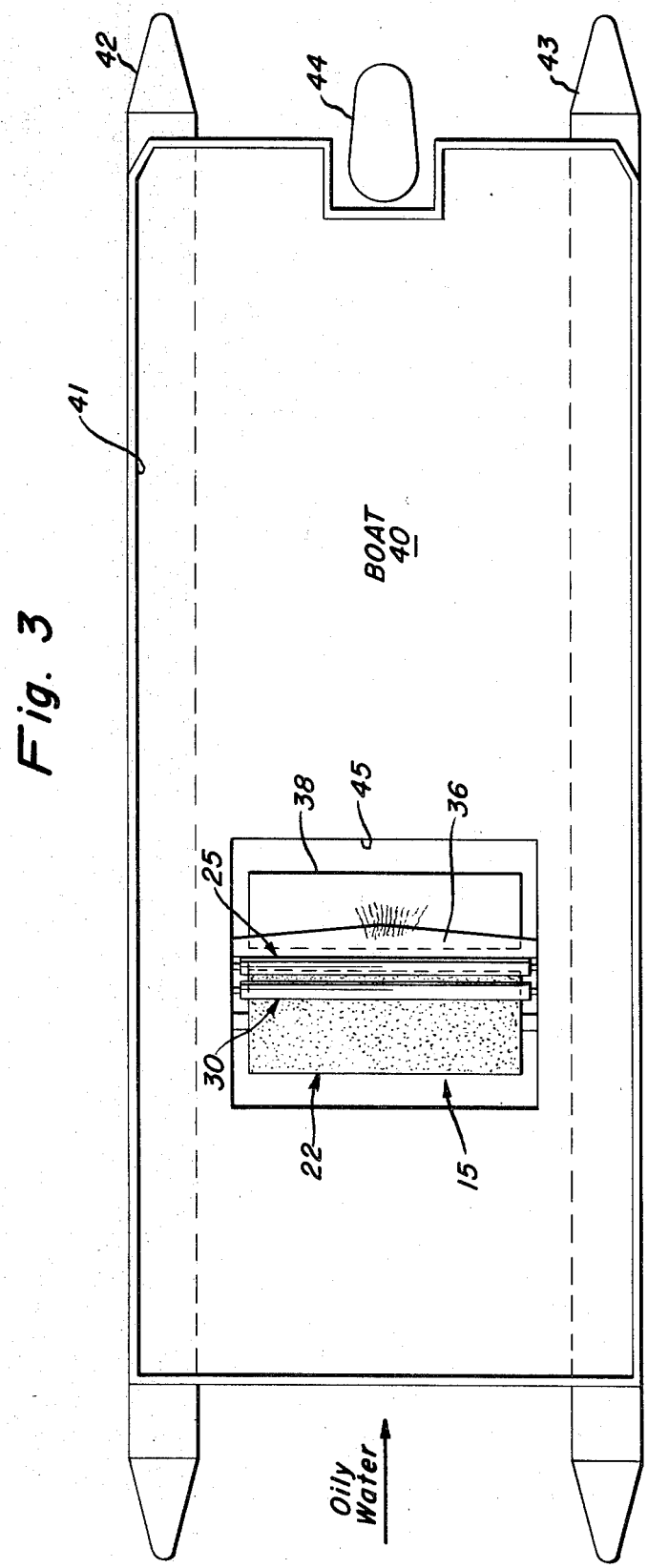

United States Patent Office 3,546,112
Patented Dec. 8, 1970

3,546,112
ABSORPTION OIL SKIMMER
Robert G. Will, Munster, and William F. Swiss, Jr., Highland, Ind., assignors to Standard Oil Company, Chicago, Ill., a corporation of Indiana
Filed Jan. 29, 1968, Ser. No. 701,395
Int. Cl. B01d 15/06, 17/04
U.S. Cl. 210—30       11 Claims

ABSTRACT OF THE DISCLOSURE

A power driven apparatus having a rotation means with a closed supporting surface, absorber means for absorbing water and oil supported on the surface, removal means for sequentially removing water and oil from the absorber means, the removal means being a plurality of rollers exerting different pressures against the absorber means, and wiper means for effectuating the withdrawal of the oil.

BACKGROUND OF THE INVENTION

This invention relates to novel method and apparatus for skimming pools of oil and other liquid hydrocarbon compounds from water. The apparatus and method of this invention relates to the separation of oil, oil compounds, and other similarly immiscible materials from the surface of water bodies where any accumulation of such immiscible materials may occur.

The current awareness of the necessity for conserving environmental resources arises out of the existence of resource depletion throughout the world. The realization that water is one of our most important environmental resources presents many challenging problems for society and particularly for industry today. One facet of this problem involves the removal of immiscible contaminants from water bodies such as hydrocarbons and oil-base compounds in the continuing effort to combat stream, lake, and seacoast pollution despite the myriad of sources of the immiscible pollutant.

Many methods and devices have been devised in an attempt to feasibly accomplish some degree of oil removal from water bodies. Many of these attempts to practically accomplish oil-water separation are exemplified by the art. Floating booms have long been known for use in capturing and containing oil spills; however, the separation of the oil from the water remains as a grave problem. Boats, such as barges, floats, etc., having various types of devices mounted thereon for skimming oil spills and collecting the immiscible materials from the surface of the water have been known and used to the limited extent of their practicality despite the obvious inherent problems.

Many other methods and apparatus which depend for their success upon the differential gravity of water and oil have been employed in a attempt to satisfactorily separate the oil from water; however, the attendant problems such as sudden changes in the water level or the oil level results in poor separation thereof. Additionally, there always exists the problem of capturing large amounts of water with any recovered oil which naturally requires large amounts of additional work and expense to handle and to separate the materials. Ordinarily, the separation and/or skimming devices known in the prior art appear to have the implicit limitation which requires that a substantial pool of oil must be on the surface of the water in a non-dispersed manner to effectuate any degree of success in removing and recovering the oil.

Other approaches to the problems of removing and separating oil from water are known. Some of these methods include attempts to sink the oil beneath the surface of the water by spreading such materials as carbonized sand to provide a temporary anti-pollution measure. In a similar manner the application of an emulsifier such as a detergent to the surface of the water body supporting a pool of oil is also known.

Some of the means and methods exemplified by the art include U.S. Pat. No. 3,259,245 to Earle; U.S. Pat. No. 3,314,540 to Lane; a U.S. Pat. No. 3,314,545 to Grabbe; and a British Pat. No. 735,254 to Savell. None of the known art appears to suggest or render obvious the instant novel subject matter disclosed and claimed herein.

SUMMARY OF THE INVENTION

The novel apparatus and method of this invention for removing oil and other immiscible materials from the surface of water bodies includes in combination, a drive means operatively connected to a rotating means having a closed supporting surface, an absorber means for absorbing water and oil, the absorber means supported on the surface, removal means for sequentially removing water and oil from the absorber means, and wiper means for effectuating the withdrawal of the removed oil.

The drive means can include any type of prime mover which can efficiently transmit the necessary power to effectuate motion at the desired speeds to the apparatus. The drive means is not shown in the drawing since the power to effectuate the motion may be transmitted in any of the many well-known schemes such as through belts, chains, shafts, pinions and gears, etc.

The rotating means such as a cylinder or conceivably a form having many other shapes providing a supporting surface can be utilized. When the rotating means is cylindrical in shape resembling a drum the supporting surface takes the form of a cylindrical wall. The ends of the drum are closed and the cylinder is rotatable about its longitudinal axis. The rotating means may have other configurations so that the supporting surface can have a shape other than a cylindrical wall; however, the supporting surface should be such in shape to accommodate the removal means for sequentially removing water and oil.

The absorber means for absorbing water and oil is supported on the supporting surface of the rotating means. The absorber means can completely cover the supporting surface. The absorber means can be a material such as a foam rubber, a flexible resilient polyurethane material having open pores, a plastic foam, or any other similarly suitable material. The absorber means is rigidly supported by the supporting surface of the rotating means and as the rotating means is moved about its axis the absorber means has a similar rotational motion.

The removal means for sequentially removing water and oil from the absorber means includes a plurality of rollers mounted adjacent to the supporting surface of the rotating means so that the rollers can be brought into contact with the absorber means. When the plurality of rollers as in the principal embodiment of this invention are a pair of differential compression rollers, they can be continuous and elongated rollers mounted for rotation about their longitudinal axis.

The pair of rollers include a first roller which is brought into contact with the surface of the absorber means to exert a force against the surface of the absorber means to produce a mild compression therein. A second roller located above the first roller is in contact with the surface of the absorber means and applies a force against said absorber means to produce a severe compression therein. The first roller effectuates the removal of substantially all of the water from the absorber means and the second roller removes substantially all of the oil. When the rollers are long in comparison to their diameter they can, as a matter of construction, be formed so that the diameter at the ends of the rollers is slightly smaller than the diameter at the center in order to prevent bending of the rollers. Consequently, the structure of these rollers for the purposes of this invention can be defined as essentially cylindrical.

The wiper means for effectuating the withdrawal of the oil is in contact with the first roller of the removal means. The wiper means can be any type of material such as resilient rubber, Teflon, etc., which will function to wipe the oil from the surface of the roller and allow oil to drain by gravity or other means away from the rotating roller surface for collection and isolation from the water body from which the oil has been removed.

The novel method of this invention includes in combination, absorbing oil and water from the surface of a water body, applying a light force to effectuate a mild compression to remove the absorbed water from the absorber means, applying a force against the absorber means to produce a severe compression in the absorber means to remove the oil therefrom and wiping the oil from the surface of the removal means to withdrawn the oil from the system.

BRIEF DESCRIPTION OF THE DRAWINGS

FIG. 3 is a schematic plan view of the novel apparatus of this invention showing it mounted on a boat of the catamaran type.

DESCRIPTION OF A PREFERRED EMBODIMENT

Figure 2:
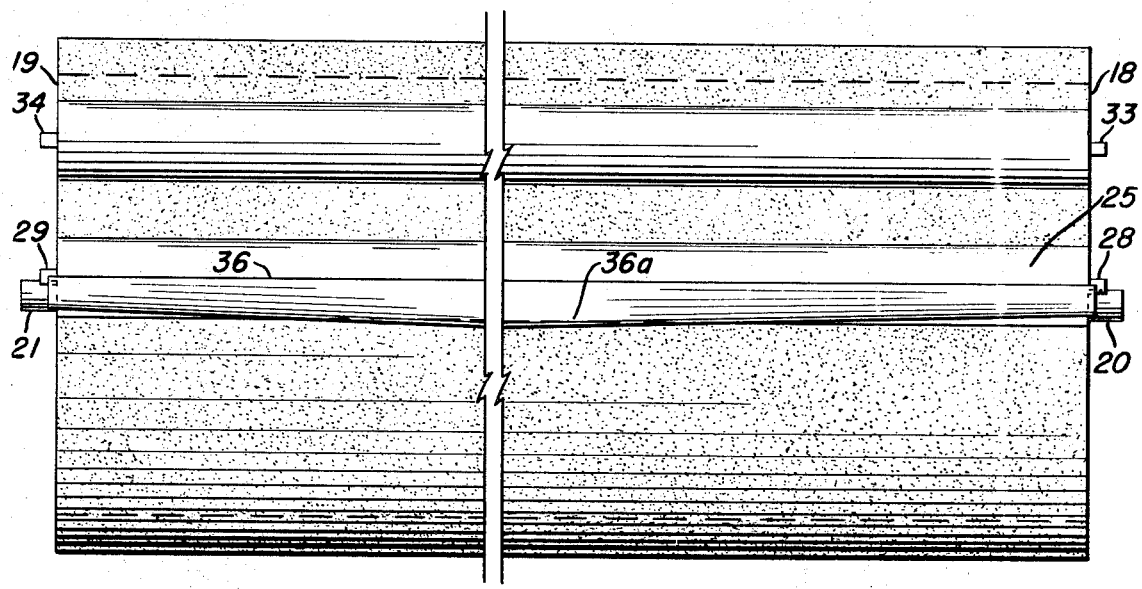
FIG. 2 is a broken elevational view of the rearward side of the novel apparatus of this invention.
Figure 1:
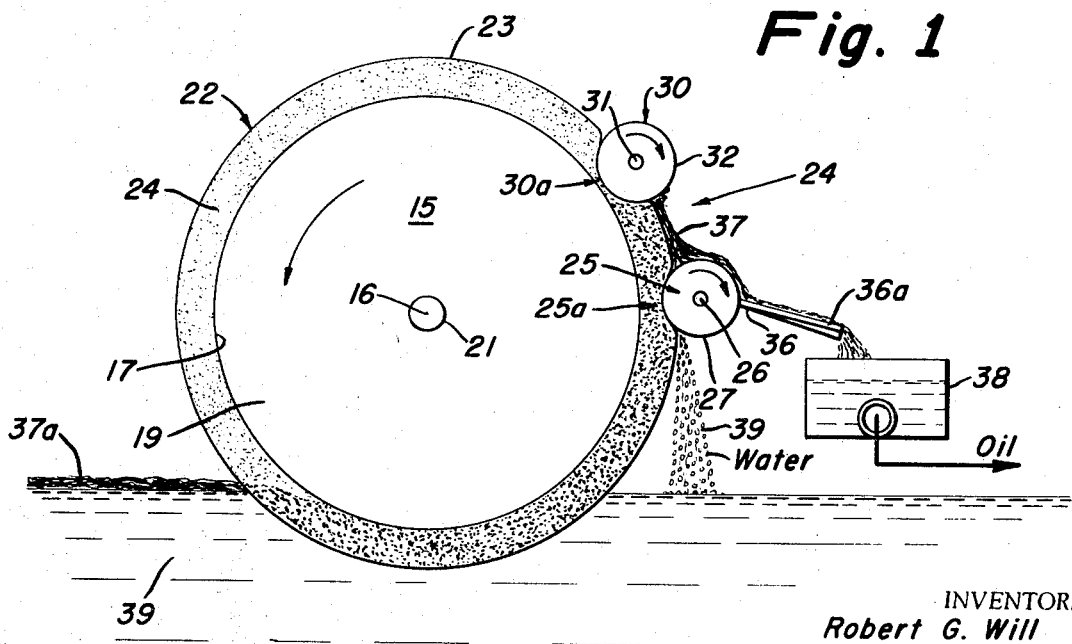
FIG. 1 is an end view in elevation of the novel apparatus of this invention.

Referring to FIG. 1, the rotating means is generally numerically designated 15 and includes the longitudinal axis 16 and supporting surface 17. The rotating means also has closed ends 18 and 19 with extending shaft ends 20 and 21 as best seen in FIG. 2.

The supporting surface 17 of the rotating means 15 has absorber means 22 rigidly supported thereon for rotational motion about the longitudinal axis 16 of the rotating means 15 in unison with said rotating means. The absorber means 22 has an exterior surface 23 and a thickness numerically designated 24.

The removal means 24 includes in combination, a first compression roller 25 having a longitudinal axis 26, an essentially cylindrical surface 27 in contact with the surface 22 of the absorber. Shaft ends 28 and 29 of FIG. 2 protrude through each end of the essentially cylindrical compression roller 25 for attachment to any desired type of operative drive means.

A second compression roller 30 of the removal means 24 has longitudinal axis 31 about which the roller is mounted for rotation. Surface 32 is in contact with the exterior surface 23 of the absorber means 22 in a manner to provide a severe compression of the absorber means 22. Like the first compression roller 25, the second compression roller 30 rotates in a clockwise direction as the rotating means 15 rotates in a counterclockwise direction. The second compression roller 30 has extended shaft ends 33 and 34 (best shown in FIG. 2). The shaft ends 33 and 34 of roller 30 accommodate any desirable operative type of drive means.

The wiper means 35 includes a wiper blade 36 in contact with surface 27 of first compression roller 25. Blade 36 extends at least the full length of roller 25 and is shaped to provide drainage of the oil 37 from the surface 27 of roller 25.

In this embodiment the oil 37 is depicted as flowing from the second compression zone 30a to the surface 27 of roller 25 and into a retaining means 38 to segregate the oil 37 from the water body. The compression roller 25 forms compression zone 25a in absorber means 22 and removes water 39 from the absorber means.

In operation, the rotating means 15 having longitudinal axis 16 and supporting surface 17 with absorber means 22 attached thereto may be mounted on a barge, boat, catamaran, etc., as shown in FIG. 3, in conjunction with the removal means 25 and the wiper means 35. The apparatus is connected with some type of retaining means for segregating the recovered oil from the water. The entire apparatus is mounted for movement so that it can be raised and lowered as required by the particular operating conditions.

FIG. 3 demonstrates a convenient way to mount the apparatus on a boat 40 of the catamaran type for movement across a body of water. Boat 40 includes pantoons 42 and 43 which maintain deck 41 above water. Motor 44 is mounted on the stern of boat 40 to provide means for propelling boat 40 across the body of water. The apparatus, including rotating means 15 with absorber means 22 attached thereto, first compression roller 25, second compression roller 30, wiper blade 36, retaining means 38 and other elements which are omitted from the drawing for the sake of clarity, is mounted on boat 40 in housing 45. Housing 45 includes an apperture in deck 41 which permits absorber means 22 to contact the water in such a manner as to remove any oil layer floating thereon.

When the apparatus is engaged for operation and lowered about the thickness of the foam into the water of a water body containing surface oil as depicted numerically by 37a in FIG. 1, the rotational motion of the absorber means absorbs the surface oil 37a as the entire apparatus is moved through the oil and water. As absorber means 22 rotates in its counterclockwise direction the resilient plastic foam having open pores or other similarly suitable material moves into contact with the first compression roller 25 rotating in a clockwise direction. The surface 27 of roller 25 contacting the exterior surface 23 of the absorber means 22 exerts a mild compression within the absorber means 22. This mild compression reduces the normal thickness 24 of the absorber means 22 sufficient to remove water 39 that has been absorbed with the oil 37a. The force applied to surface 23 of absorber means 22 by surface 27 of roller 25 causes the formation of compression zone 25a between the supporting surface 17 of rotating means 15 and roller surface 27. The compression zone 25a formed in effect by the generally mild squeezing of the absorber means 22 permits water 39 to return to the water body by gravity while the oil absorbed remains therein.

As the absorber means 22 continues to rotate with the rotating means 15 the absorber means having most of the water removed by the first compression roller 25 is brought between the surface 32 of compression roller 30 and the supporting surface 17 of rotating means 15 where a force greater than that exerted by the first roller applies a severe compression in a zone designated 30a for the removal of substantially all oil and any water that may remain. The oil 37 removed by the squeezing flows down and over the surface 27 of roller 25 where wiper means 35 having blade 36 wipes the surface 27 of roller 25 so that the oil flows over the extended surface 36a of blade 36 and into a retaining means designated 38 in FIG. 1.

As the absorber means 22 moves from beneath the surface 32 of compression roller 30 the resilient material regains its original thickness and the absorber means having the water and oil removed therefrom is regenerated so that it is capable of absorbing oil as it is moved into contact with the oil on the surface of the water body. An additional factor that allows a greater absorption of oil is that the entire apparatus is in translational motion since it is mounted on a boat which moves the apparatus over the surface of the water body. This translational velocity although moderately low allows the maintenance of more complete contact of the oil with the absorber means. The combination of the translational velocity and the rotational motion of the absorber means not only permits a better contact to exist between the oil and the absorber means but additional forces exist to push the oil into the absorber means. Generally, the rotating means is submerged at least about a depth equal to or greater than the thickness of the absorber means. This combination of translational velocity, rotational motion, and submergence permits the rotating means and the absorber means to override the oil slick and the consequent hydrostatic head forces the oil into the absorber means and provides a greater efficiency.

It is not definitely known nor fully understood why the absorber means has a greater attraction for the oil than the water; however, it is believed that a greater surface attraction exists between the oil and the surface of the absorber means than between the water and the absorber means. This suggests that the absorber means may have hydrophobic characteristics.

EXAMPLE I

An example of the specific operation of a prototype novel apparatus of this invention is described below. The apparatus having a metallic rotating means 15 with a supporting surface 17 essentially defining a cylinder had a diameter of about 8½ inches and a length of approximately 1 foot. The supporting surface 17 supported an absorber means 24 having a thickness of about 1 inch. The absorber means 22 was an open pored resilient polyurethane foam material completely covering the supporting surface 17. The removal means 24 included two metal compression rollers, each having diameters of about 1¾ inches. The wiper means being of a resilient type, such as rubber, wipe the oil from the surface 27 of roller 25 and the oil was withdrawn by gravity. Operating conditions incorporating a moderate compression of the absorber means 22 by the second compression roller 30 and absorbing an equal mixture of a crude oil and Oleum spirits produced the results shown by the collected data set forth in Table I below.

[Moderate Compression]

| | Total liquid recovered, gal./hr. | Oil in liquid recovered | |
|---|---|---|---|
| | | Gal./hr. | Percent |
| Drum speed, r.p.m.: | | | |
| 1 | 6.3 | 5.2 | 82.5 |
| 2 | 12.7 | 10.3 | 81.1 |
| 4 | 27.7 | 21.4 | 77.3 |
| 5 | 36.4 | 23.8 | 65.4 |
| 6 | 50.7 | 31.7 | 62.5 |
| 10 | 69.7 | 44.4 | 63.7 |

EXAMPLE II

Essentially the same conditions existed as in Example I except that the oil roller 30 had a setting such that mild compression occurred and the data set forth below in Table II was collected.

TABLE II.—DRUM SPEED AND OIL ROLLER SETTING

[Mild Compression]

| | Total liquid recovered, gal./hr. | Oil in liquid recovered | |
|---|---|---|---|
| | | Gal./hr. | Percent |
| Drum speed, r.p.m.: | | | |
| 1 | 4.0 | 3.2 | 80.0 |
| 2 | 7.9 | 6.3 | 79.8 |
| 4 | 14.3 | 10.3 | 72.0 |
| 5 | 19.8 | 11.9 | 60.2 |
| 6 | 25.3 | 13.5 | 53.4 |
| 10 | 31.7 | 12.7 | 40.1 |

This invention is described by reference to the specific embodiments defined and claimed herein; however, it is understood that the embodiments are not intended to limit the scope of the invention, but these embodiments are presented only to teach the best modes contemplated for practising this invention.

Having thus described the invention, what is claimed is:

1. The process of separating a liquid layer which consists essentially of oil from the surface of a body of water including the steps of:
   (a) absorbing the oil layer and a portion of the water into an open pored resiliant material as the material passes through the oil layer and body of water;
   (b) applying a mild compressive force to the material to remove the water;
   (c) applying a severe compressive force to the material to remove the oil; and
   (d) collecting the oil removed from the open pored resilient material during application of the severe compressive force.

2. The process of claim 1 wherein the material passes through the oil in rotational motion.

3. The process of claim 1 wherein the material passes through the oil in a combination of rotational and translational motion.

4. Apparatus for separating a liquid layer consisting essentially of hydrocarbons from the surface of a body of water, comprising in combination:
   (a) a drum mounted for rotation along its longitudinal axis on a mounting platform, said drum having its external surface covered with an open pored resilient plastic foam, said drum being positioned so that as said drum rotates a portion of said foam is continually immersed as another portion is continually withdrawn from said liquid layer and at least some part of said foam is in communication with said water and whereby at least a portion of said liquid layer and a portion of said body of water is absorbed by said foam;
   (b) means to rotate said drum;
   (c) a first compression means positioned to apply a mild compressive force to said foam after said foam is withdrawn from said liquid layer, said first compression means positioned remotely from said liquid layer and said body of water and further positioned to apply a sufficient compressive force to remove at least a portion of absorbed water from said foam while allowing said hydrocarbon to remain absorbed in said foam;
   (d) a second compression means positioned to apply a severe compressive force to said portion of the foam already having been contacted by said first compression means but prior to reimmersion of the contacted foam into said liquid layer, said second compression means being located above said first compression means and remote from said liquid layer and water, said second compression means positioned to apply sufficient compressive force to remove most of the absorbed hydrocarbon from the contacted foam so that said removed hydrocarbon flows downwardly onto said first compression means; and
   (e) means in contact with said first compression means for removing hydrocarbon therefrom.

5. The apparatus of claim 4 wherein said mounting includes a boat.

6. The process of separating a liquid layer consisting essentially of oil from a water surface, said process including the steps of:
   (a) passing an open pored resiliant plastic material through said layer of oil and into said water such that a portion of said oil and a portion of said water is absorbed by said material;
   (b) withdrawing said material from said oil layer and water;
   (c) applying a mild compressive force to said material which is sufficient to remove most of the absorbed water from the material without removing an appreciable quantity of the oil absorbed therein;
   (d) applying a severe compressive force to said material to remove essentially all liquid absorbed therein; and (e) collecting the liquid removed during application of the severe compressive force to said material.

7. Apparatus for separating a liquid layer consisting essentially of hydrocarbons from the surface of a body of water, which apparatus comprises:

(a) a drum mounted for rotation along its longitudinal axis on a mounting platform, said drum having its external surface covered with an open pored resilient plastic foam, said drum being positioned so that as said drum rotates, a portion of said foam is continually immersed as another portion is continually withdrawn from said liquid layer and at least some part of said foam is in communication with said water and whereby at least a portion of said liquid layer and a portion of said body of water is absorbed by said foam;

(b) means to rotate said drum;

(c) a first compression means positioned to apply a mild compressive force to said foam after said foam is withdrawn from said liquid layer, said first compression means positioned remotely from said liquid layer and said body of water and further positioned to apply a sufficient compressive force to remove at least a portion of absorbed water from said foam while allowing said hydrocarbon to remain absorbed in said foam;

(d) a second compression means positioned to apply a severe compressive force to said portion of the foam already having been contacted by said first compression means but prior to reimmersion of the contacted foam into said liquid layer, said second compression means being located remotely from said liquid layer and water and applying sufficient compressive force to remove most of the absorbed hydrocarbon from the contacted foam; and (e) means to collect the hydrocarbon which is removed from said foam by operation of said second compression means.

8. The structure of claim 7 wherein said first compression means includes a roller in contact with said open pored resilient plastic foam.

9. The structure of claim 7 wherein said first compression means and said second compression means each includes a roller in contact with said open pored resilient plastic foam.

10. The structure of claim 7 wherein said means to collect said hydrocarbon includes a wiper means in contact with said first compression means.

11. The structure of claim 7 wherein said open pored resilient plastic foam comprises polyurethane.

References Cited

UNITED STATES PATENTS

| | | | |
|---|---|---|---|
| 2,860,973 | 11/1958 | Wells | 210—65X |
| 2,866,827 | 12/1958 | Jurgeleit et al. | 210—24X |
| 3,314,545 | 4/1967 | Grabbe et al. | 210—242 |
| 3,334,042 | 8/1967 | Teitsma | 210—40X |
| 3,426,902 | 2/1969 | Kilpeat et al. | 210—179 |

FOREIGN PATENTS

| | | | |
|---|---|---|---|
| 1,026,201 | 4/1966 | Great Britain | 210—40 |

JOHN ADEE, Primary Examiner

U.S. Cl. X.R.

210—40, 73, 242